United States Patent
Hanif et al.

(10) Patent No.: US 10,031,688 B2
(45) Date of Patent: Jul. 24, 2018

(54) REALLOCATING STORAGE RESOURCES TO COMPUTING DEVICES

(71) Applicant: International Business Machines Corporation, Armonk, NY (US)

(72) Inventors: Tariq Hanif, Lagrangeville, NY (US); William J. Rooney, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/252,357

(22) Filed: Aug. 31, 2016

(65) Prior Publication Data

US 2018/0059979 A1  Mar. 1, 2018

(51) Int. Cl.
G06F 3/06 (2006.01)

(52) U.S. Cl.
CPC .......... *G06F 3/0631* (2013.01); *G06F 3/0604* (2013.01); *G06F 3/0619* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 6,173,377 B1 | 1/2001 | Yanai et al. | |
| 7,287,047 B2 | 10/2007 | Kavuri | |
| 7,509,468 B1 | 3/2009 | Dalal et al. | |
| 7,934,116 B2 | 4/2011 | Mehrdad | |
| 7,958,393 B2 | 6/2011 | Bobak et al. | |
| 8,688,773 B2 | 4/2014 | Dayley | |
| 2006/0074993 A1 | 4/2006 | Pulamarasetti et al. | |
| 2014/0359098 A1* | 12/2014 | Xu | H04L 67/10 709/223 |
| 2015/0254150 A1* | 9/2015 | Gordon | G06F 11/1662 714/6.3 |

OTHER PUBLICATIONS

Gopisetty et al., "Automated planners for storage provisioning and disaster recovery", IBM J. Res. & Dev., vol. 52, No. 4/5, Jul./Sep. 2008, pp. 1-13, © Copyright 2008 by International Business Machines Corporation.

"I/O Priority Management for Copy Services Relationships", An IP.com Prior Art Database Technical Disclosure, Authors et. al.: Disclosed Anonymously, IP.com No. IPCOM000198983D, IP.com Electronic Publication Date: Aug. 19, 2010, 5 pages, <http://ip.com/IPCOM/000198983>.

* cited by examiner

Primary Examiner — Edward J Dudek, Jr.
Assistant Examiner — Ralph A Verderamo, III
(74) Attorney, Agent, or Firm — Pooya Shoghi Ghalehshahi; William H. Hartwell

(57) ABSTRACT

A computer-implemented method includes identifying a storage reallocation plan associated with a primary storage volume, a secondary storage volume, and one or more client computing devices; determining a systematic importance indicator associated with the primary storage volume; and determining a systematic connectivity indicator associated with the storage reallocation plan and the one or more client computing devices. The computer-implemented method further includes determining a storage reallocation conclusion based on the systematic importance indicator and the systematic connectivity indicator. A corresponding computer program product and computer system are also disclosed.

14 Claims, 5 Drawing Sheets

| Storage Reallocation Plan (121) | Connectivity Indicator (261) | Importance Indicator (251) | Reallocation Conclusion (160) |
|---|---|---|---|
| SV1 (411) → SV2 (412) | Complete | Non-vital | Approve |
| SV3 (413) → SV4 (414) | Non-complete | Non-vital | Reject |
| SV5 (415) → SV6 (416) | Non-complete | Vital | Approve Modified |

REALLOCATING STORAGE RESOURCES TO COMPUTING DEVICES

BACKGROUND

The present invention relates generally to the field of computer storage systems, and more particularly to storage resource reallocation in those systems.

In computer storage systems, reallocating storage resources in a manner that is efficient and does not unduly compromise the integrity and availability of data across computer systems is an important task. In such systems, an inefficient or otherwise unworkable storage resource reallocation strategy can compromise the achievement of the goals and objectives of the computer system as a whole. Developers and users of computer storage systems continue to face difficulties with problems associated with storage resource allocation in computer storage systems.

SUMMARY

A computer-implemented method includes identifying a storage reallocation plan associated with a primary storage volume, a secondary storage volume, and one or more client computing devices; determining a systematic importance indicator associated with the primary storage volume; and determining a systematic connectivity indicator associated with the storage reallocation plan and the one or more client computing devices. The computer-implemented method further includes determining a storage reallocation conclusion based on the systematic importance indicator and the systematic connectivity indicator. A corresponding computer program product and computer system are also disclosed.

BRIEF DESCRIPTION OF THE DRAWINGS

FIG. 4 is an operational example of storage reallocation conclusion determination, in accordance with at least one embodiment of the present invention.

DETAILED DESCRIPTION

Figure 1:
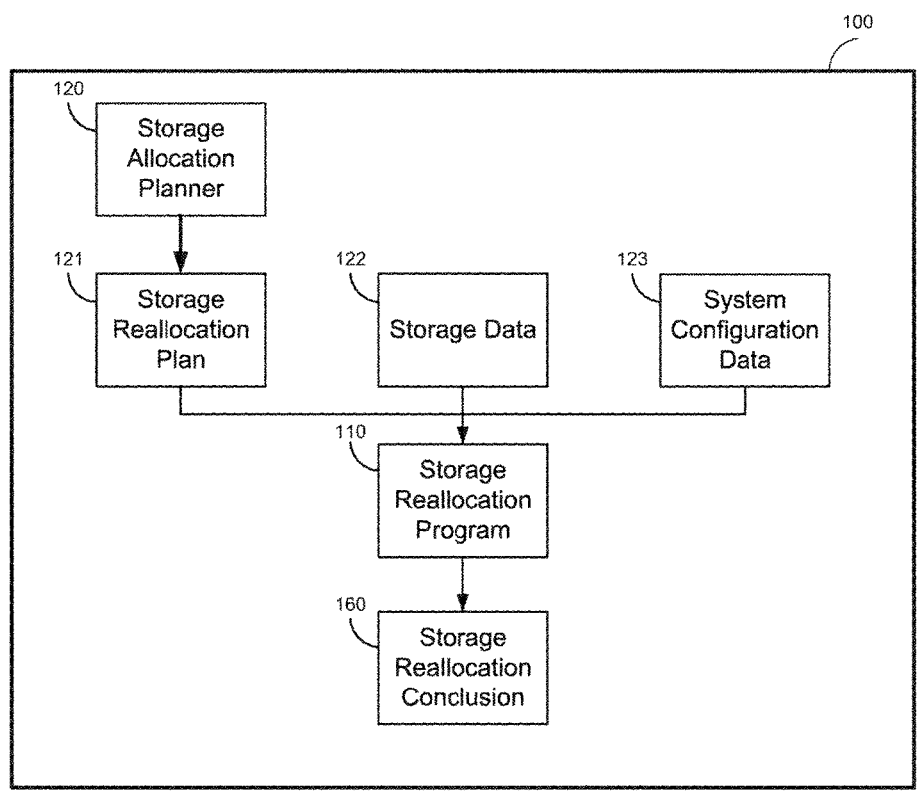
FIG. 1 is a block diagram of one embodiment of a computer system environment suitable for operation of a storage reallocation program, in accordance with at least one embodiment of the present invention.

FIG. 1 is a computer system environment 100 suitable for operation of a storage reallocation program 110, in accordance with at least one embodiment of the present invention. In the computer system environment 100 depicted in FIG. 1, a storage allocation planner 120 is any combination of one or more computer components that develop a plan for storage of at least one designated segment of data (i.e., at least one "storage volume") on at least one storage device (e.g., at least one direct access storage device). Examples of a storage allocation planner 120 include an IBM HyperSwap policy system (the "IBM® HyperSwap®"). In some embodiments, the IBM HyperSwap: (i) designates a storage resource as a primary storage resource and a storage volume on the primary storage resource as a primary storage volume; (ii) enables an application and/or customer to request a synchronous mirroring of the primary storage volume on one or more secondary storage resources (i.e., to create one or more "secondary storage volumes"); and/or (iii) upon detecting an unavailability and/or inaccessibility of the primary storage volume (i.e., one volume, all volumes, or a subset of all volumes) stored on the primary storage resource, enables input/output (I/O) requests to the primary storage volume to be directed to at least one of the one or more secondary storage volumes. In at least some embodiments, a storage resource is any combination of one or more computer components that are, at least at one time, capable of storing at least one data artefact in a short-term or long-term fashion. Examples of a storage resource include main memory and hard disk storage components.

In the computer system environment 100 depicted in FIG. 1, the storage allocation planner 120 produces a storage reallocation plan 121. In at least some embodiments, a storage reallocation plan 121 is a plan for storage of at least one storage volume on at least one storage device. Examples of a storage reallocation plan include a Hyperswap-based plan in IBM® HyperSwap®. In some embodiments, a Hyperswap-based plan comprises: (i) identifying a designation of a storage volume as the original version of a primary storage volume; (ii) synchronously mirroring the storage volume on one or more storage resources (i.e., to create one or more secondary storage volumes); (iii) detecting that the original version of the primary storage volume is no longer available and/or accessible; (iv) determining that one or more client computing devices (e.g., one or more computer systems and/or virtual servers with the need to access the contents of the primary storage volume) are deemed ineligible and/or incapable of accessing one or more secondary storage volumes; (v) removing the ineligible and/or incapable client computing resources from a grouping (e.g., a system complex, sysplex, host, or server) of the client computing devices eligible to participate in the totality of the Hyperswap-based plan; and/or (vi) directing I/O requests from the grouping of the client computing devices to at least one of the one or more secondary storage volumes. In some embodiments, a storage reallocation plan (such as a Hyper-Swap-based plan) is triggered with there is a storage and/or access failure with respect to at least one primary storage volume.

In the computer system environment depicted in FIG. 1, storage data 122 is any combination of one or more data artefacts that contain at least one information artefact about the storage of at least one storage volume, and system configuration data 123 is any combination of one or more data artefacts that contain at least one information artefact about at least one computer device affected by and/or participating in the storage reallocation plan 121. In at least some embodiments, the storage reallocation program 110 uses the storage reallocation plan 121, the storage data 122, and the system configuration data 123 to determine a storage reallocation conclusion 160. In at least some embodiments, a storage reallocation conclusion 160 is a combination of one or more artefacts that contain at least one information artefact about whether the storage reallocation program 110 accepts, rejects, and/or modifies a storage reallocation plan 121.

Figure 2:
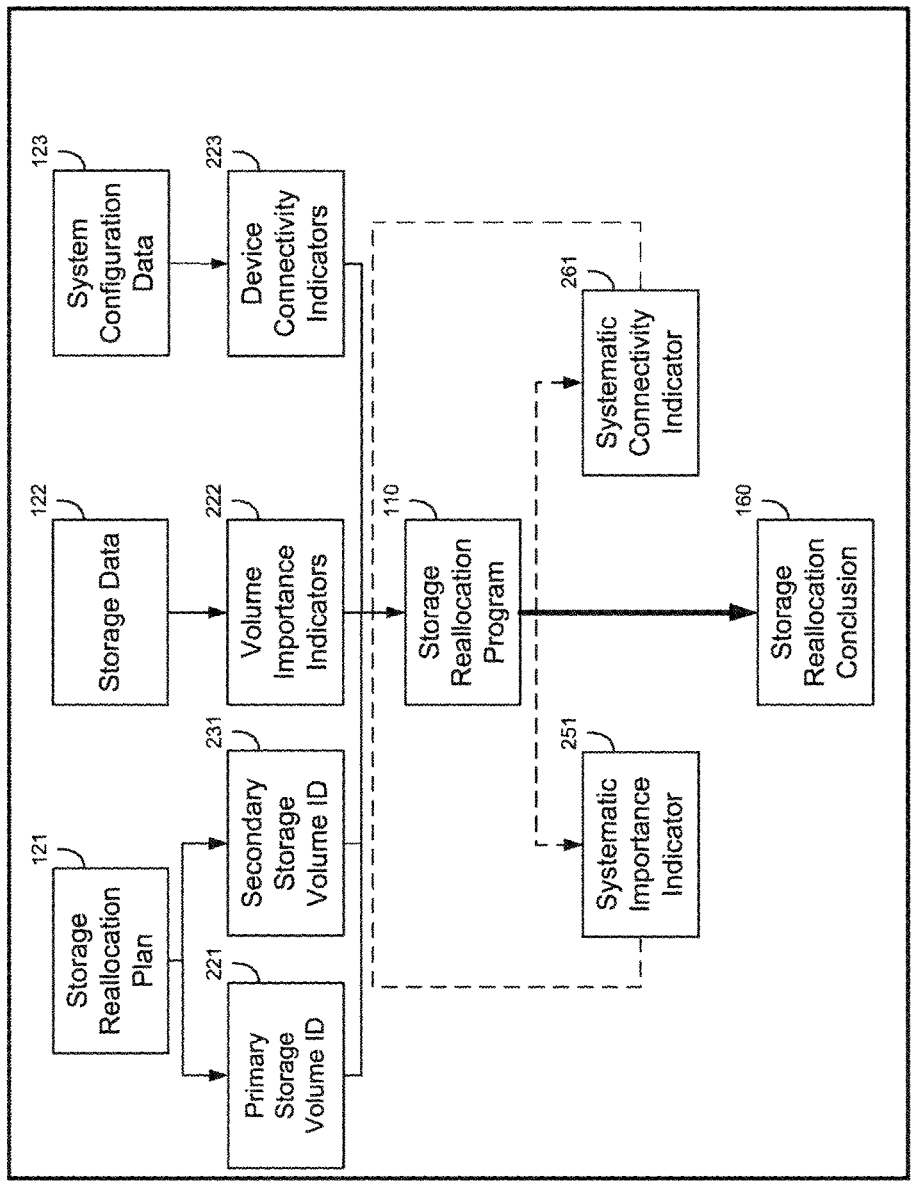
FIG. 2 is a flowchart diagram of a storage reallocation program, in accordance with at least one embodiment of the present invention.

FIG. 2 is a data-flow diagram of a storage reallocation program 110, in accordance with at least one embodiment of the present invention. In the embodiment depicted in FIG. 2, the program 110 receives a primary storage volume ID 221 and a secondary storage volume ID 231 from the storage reallocation plan 121. In at least some embodiments, the primary storage volume ID 221 is any combination of one or more data artefacts that contain at least one information artefact about identification of a primary storage volume. In at least some embodiments, a primary storage volume is a storage volume that is designated as being important and/or essential to I/O requests of at least one client computer device. In some embodiments, a primary storage volume is designated as requiring a (e.g., synchronous) mirroring on one or more storage resources. In at least some embodiments, the secondary storage volume ID 231 is any combination of one or more data artefacts that contain at least one information artefact about identification of a secondary storage volume. In at least some embodiments, a secondary storage volume is a storage volume that is designated as having at least one pre-defined relationship with at least one primary storage volume (e.g., is a synchronous mirrored copy of a primary storage volume).

In the embodiment depicted in FIG. 2, the storage reallocation program 110 receives one or more volume importance indicators associated with each of the primary storage volume and the secondary storage device volume the storage data 122. In at least some embodiments, the volume importance indicator 222 associated with a storage volume is any indication of whether and/or how much the storage volume has a vital, special, and/or privileged status to the operation and/or quality of service of the computer system within which the storage reallocation plan 121 operates. In some embodiments, a volume importance indicator is associated only with the primary storage volume, and a secondary storage volume gets its importance determination from the volume importance indicator associated with the corresponding primary storage volume.

In the embodiment depicted in FIG. 2, the storage reallocation program 110 receives a device connectivity indicator 223 associated with each client computing device from the system configuration data 123. In at least some embodiments, the device connectivity indicator 223 associated with a client computing device is any indication of whether the client device is deemed eligible and/or capable of participating in the storage reallocation plan 121 (e.g., based on one or more plan participation guidelines, such as whether the client computing device can access at least one secondary storage volume).

In the embodiment depicted in FIG. 2, the storage reallocation program 110 uses the primary storage volume ID 221 and the one or more volume importance indicators 222 to determine a systematic importance indicator. In at least some embodiments, the systematic importance indicator 251 is any indication of the volume importance indicator 222 associated with the primary storage volume. In at least some embodiments, the program uses the one or more device connectivity indicators 223 associated with the one or more client computing devices to determine a systematic connectivity indicator 261. In at least some embodiments, the systematic connectivity indicator 261 is any indication of whether any device connectivity indicator 223 indicates that a client computing is deemed ineligible and/or incapable of participating in the storage reallocation plan 121. In at least some embodiments, the program 110 uses the systematic importance indicator 251 and the systematic connectivity indicator 261 to determine the storage reallocation conclusion 160.

Figure 3:
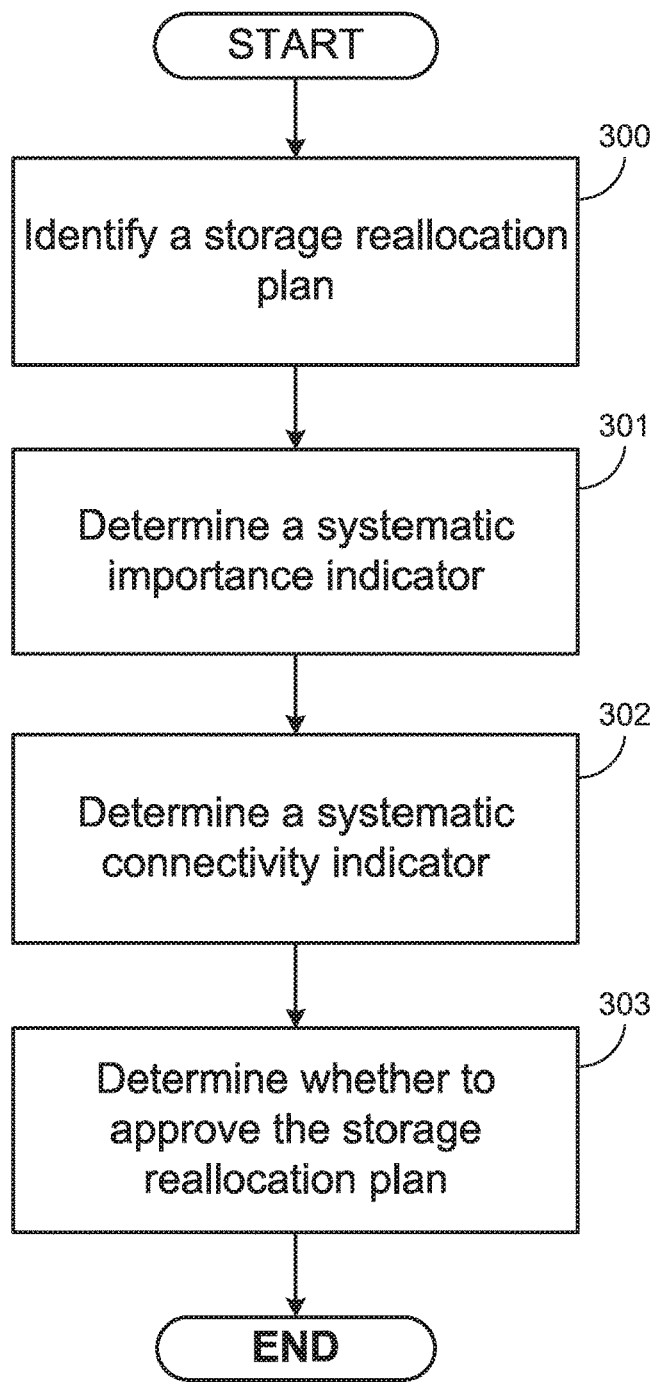
FIG. 3 is a flowchart diagram of a storage reallocation program, in accordance with at least one embodiment of the present invention.

FIG. 3 is a flow-chart diagram of a storage reallocation program, in accordance with at least one embodiment of the present invention. At step 300, the program identifies a storage reallocation plan associated with a primary storage volume, a secondary storage volume, and one or more client computing devices. At step 301, the program determines a systematic importance indicator being associated with the primary storage volume. At step 302, the program determines a systematic connectivity indicator associated with the storage reallocation plan and the one or more client computing devices. At step 303, the program determines a storage reallocation conclusion based on the systematic importance indicator and the systematic connectivity indicator.

In some embodiments, determining the storage reallocation conclusion further comprises: (i) responsive to the systematic connectivity indicator indicating a complete connectivity condition, approving the storage reallocation plan; and (ii) responsive to the systematic connectivity indicator indicating a non-complete connectivity condition: (A) responsive to the systematic importance indicator indicating a non-vital primary storage condition, rejecting the storage reallocation plan; and (B) responsive to the systematic importance indicator indicating a vital primary storage condition, approving a modified storage reallocation plan. In some of those embodiments, the storage reallocation program further comprises identifying a client system complex comprising the one or more client computing devices, wherein the modified storage reallocation plan comprises removing at least one of the one or more client computing devices from the client system complex. In some embodiments, the non-vital primary storage condition means that we have had a storage failure (or maybe we simply cannot access an otherwise functioning storage device, due to for example a problem in the fabric/network).

In at least some embodiments, a complete connectivity condition is a condition under which all client computing device can access the secondary storage volume. In at least some embodiments, a non-complete connectivity condition is a condition under which at least one client computing device cannot access at least one secondary storage volume. In at least some embodiments, a modified storage reallocation plan is a storage plan that is developed by a computer component (e.g., the storage reallocation plan 121) by adding at least one step to, removing at least one step from, or modifying at least one step of the storage reallocation plan. In at least some embodiments, a vital primary storage condition is a condition under which the primary storage condition is designated as having a vital, special, and/or privileged status to the operation and/or quality of service of the computer system within which the storage reallocation plan 121 operates. In at least some embodiments, a non-vital primary storage condition is a condition under which the primary storage condition is designated as not having a vital, special, and/or privileged status to the operation and/or quality of service of the computer system within which the storage reallocation plan 121 operates. In at least some embodiments, a client system complex is any grouping of at least one of the one or more client computing devices that are deemed eligible and/or capable of accessing the secondary storage volume (and/or at least one secondary storage volume when the primary storage volume is associated with more than secondary storage volume).

In some embodiments, determining the systematic connectivity indicator further comprises determining whether each of the one or more client computing devices can access the secondary storage volume; responsive to determining that each of the one or more client computing devices can access said secondary storage volume, determining a complete connectivity condition; and responsive to determining that at least one of the one or more client computing devices cannot access the secondary storage volume, determining a non-complete connectivity condition. In some embodiments, the systematic importance indicator is selected from the group consisting of: a vital primary storage condition; and a non-vital primary storage condition. In some embodiments, the storage reallocation plan is determined based on a Hyperswap-based policy. In some embodiments, the primary storage volume and the secondary storage volume are both associated with a disk mirroring guideline. In at least some embodiments, a disk mirroring guideline associated with two storage volumes is a combination of one or more data artefacts that indicate a plan for mirroring (synchronously or otherwise) at least part of the contents of one storage volume in the other storage volume. In some embodiments, the storage reallocation program determines the failure of a storage volume by periodically (e.g., every minute) sending a trivial I/O command (e.g., a NOP command) to a storage volume. The program uses the trivial I/O command to determine whether any vital primary volume has failed (e.g., upon lack of receipt of an acknowledgement from the storage volume).

FIG. 4 is an operational example of storage reallocation conclusion determination, in accordance with at least one embodiment of the present invention. In the embodiment depicted in FIG. 4, the storage reallocation program 110 determines a storage reallocation conclusion 160 approving the storage reallocation plan 121 replacing storage volume SV1 411 with storage volume SV2 412 because the storage reallocation plan 121 has a systematic connectivity indicator 261 denoting a complete connectivity condition and a systematic importance indicator 251 denoting a non-vital primary storage condition. Therefore, the recommended course of action here is to switch from SV1 to SV2. In this case all hosts have connectivity to SV2, so a failure of a volume SV1 should cause us to HyperSwap to SV2, since after the HyperSwap all systems (or hosts) will have access to all volumes. The program determines a storage reallocation conclusion 160 rejecting the storage reallocation plan 121 replacing storage volume SV3 413 with storage volume SV4 414 because the storage reallocation plan 121 has a systematic connectivity indicator 261 denoting a non-complete connectivity condition and a systematic importance indicator 251 denoting a non-vital primary storage condition. The program determines a storage reallocation conclusion 160 approving a modified version of the storage reallocation plan 121 replacing storage volume SV5 415 with storage volume SV6 416 because the storage reallocation plan 121 has a systematic connectivity indicator 261 denoting a non-complete connectivity condition and a systematic importance indicator 251 denoting a vital primary storage condition.

In general, one or more steps associated with different embodiments of the storage reallocation program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the storage reallocation program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Aspects of the present invention enable reallocating storage resources in a computer storage system in a manner that is cognizant of both the ability of computing devices in the system to participate in the reallocation plan as well as the importance of preventing failure with respect to vital storage volumes. Nevertheless, the aforementioned advantages are not required to be present in all of the embodiments of the invention and may not be present in all of the embodiments of the invention.

Figure 5:
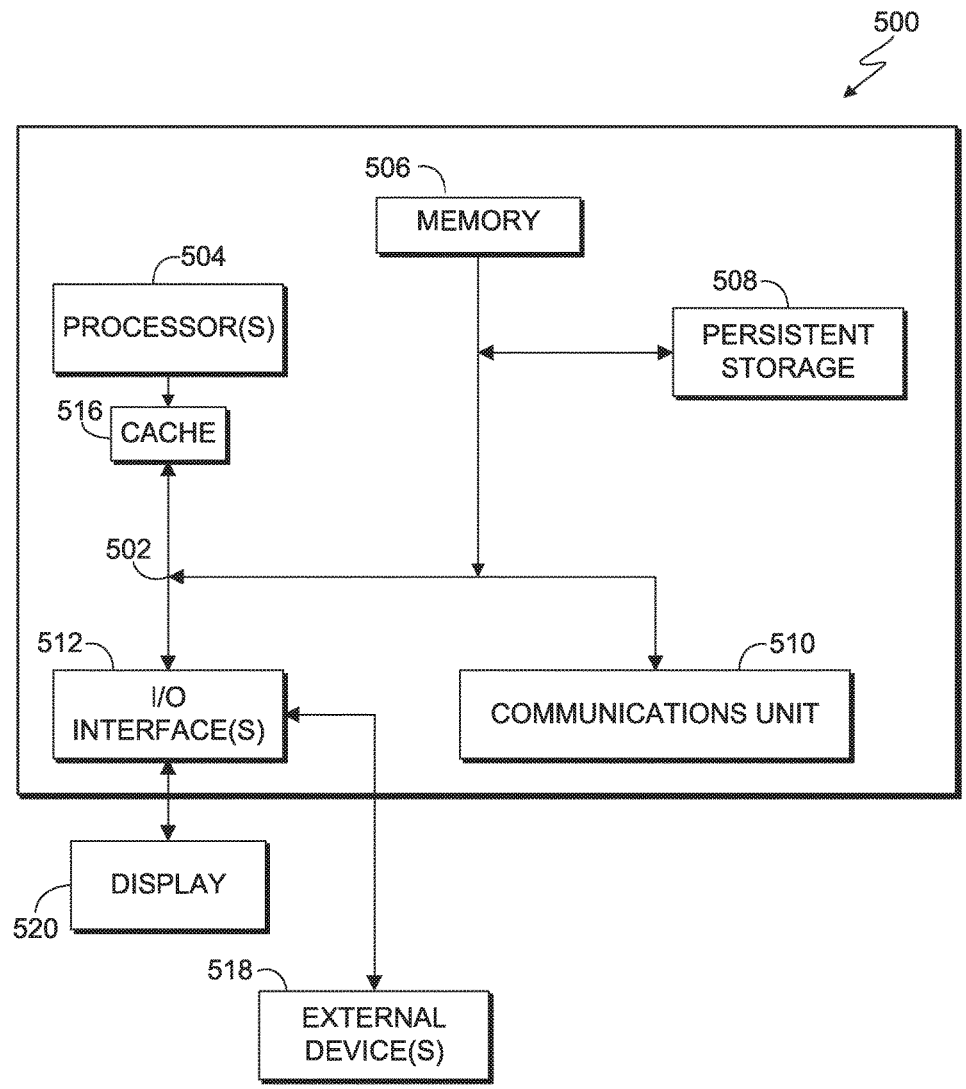
FIG. 5 is a block diagram of a computing apparatus suitable for executing a storage reallocation program, in accordance with at least one embodiment of the present invention.

FIG. 5 is a block diagram depicting components of a computer 500 suitable for executing the storage reallocation program. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the storage reallocation program may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The storage reallocation program may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a storage reallocation plan, said storage reallocation plan being associated with a primary storage volume, a secondary storage volume, and one or more client computing devices;
   determining a systematic importance indicator, said systematic importance indicator being associated with said primary storage volume;
   determining a systematic connectivity indicator, said systematic connectivity indicator being associated with said storage reallocation plan and said one or more client computing devices; and
   determining a storage reallocation conclusion based on said systematic importance indicator and said systematic connectivity indicator, wherein determining said storage reallocation conclusion further comprises:
      responsive to said systematic connectivity indicator indicating a complete connectivity condition, approving said storage reallocation plan; and
      responsive to said systematic connectivity indicator indicating a non-complete connectivity condition:
         responsive to said systematic importance indicator indicating a non-vital primary storage condition, rejecting said storage reallocation plan; and
         responsive to said systematic importance indicator indicating a vital primary storage condition, approving a modified storage reallocation plan.

2. The computer-implemented method of claim 1, further comprising:
   identifying a client system complex, said client system complex comprising said one or more client computing devices; and
   wherein said modified storage reallocation plan comprises removing at least one of said one or more client computing devices from said client system complex.

3. The computer-implemented method of claim 1, wherein determining said systematic connectivity indicator further comprises:
   determining whether each of said one or more client computing devices can access said secondary storage volume;
   responsive to determining that each of said one or more client computing devices can access said secondary storage volume, determining a complete connectivity condition; and
   responsive to determining that at least one of said one or more client computing devices cannot access said secondary storage volume, determining a non-complete connectivity condition.

4. The computer-implemented method of claim 1, wherein said systematic importance indicator is selected from the group consisting of:
   a vital primary storage condition; and
   a non-vital primary storage condition.

5. The computer-implemented method of claim 1, wherein said primary storage volume and said secondary storage volume are both associated with a disk mirroring guideline.

6. A computer program product, comprising one or more computer readable storage media and program instructions stored on said one or more computer readable storage media, said program instructions comprising instructions to:
   identify a storage reallocation plan, said storage reallocation plan being associated with a primary storage volume, a secondary storage volume, and one or more client computing devices;
   determine a systematic importance indicator, said systematic importance indicator being associated with said primary storage volume;
   determine a systematic connectivity indicator, said systematic connectivity indicator being associated with said storage reallocation plan and said one or more client computing devices; and
   determine a storage reallocation conclusion based on said systematic importance indicator and said systematic connectivity indicator, wherein said instructions to determine said storage reallocation conclusion further comprise instructions to:
      responsive to said systematic connectivity indicator indicating a complete connectivity condition, approve said storage reallocation plan; and
      responsive to said systematic connectivity indicator indicating a non-complete connectivity condition:
         responsive to said systematic importance indicator indicating a non-vital primary storage condition, reject said storage reallocation plan; and
         responsive to said systematic importance indicator indicating a vital primary storage condition, approve a modified storage reallocation plan.

7. The computer program product of claim 6, wherein said program instructions further comprise instructions to identify a client system complex, said client system complex comprising said one or more client computing devices; and
   said modified storage reallocation plan comprises removing at least one of said one or more client computing devices from said client system complex.

8. The computer program product of claim 6, wherein said instructions to determine said systematic connectivity indicator further comprise instructions to:
- determine whether each of said one or more client computing devices can access said secondary storage volume;
- responsive to determining that each of said one or more client computing devices can access said secondary storage volume, determine a complete connectivity condition; and
- responsive to determining that at least one of said one or more client computing devices cannot access said secondary storage volume, determine a non-complete connectivity condition.

9. The computer program product of claim 6, wherein said systematic importance indicator is selected from the group consisting of:
- a vital primary storage condition; and
- a non-vital primary storage condition.

10. The computer program product of claim 6, wherein said primary storage volume and said secondary storage volume are both associated with a disk mirroring guideline.

11. A computer system comprising:
- a processor;
- one or more computer readable storage media; and
- computer program instructions;
- said computer program instructions being stored on said one or more computer readable storage media; and
- said computer program instructions comprising instructions to:
  - identify a storage reallocation plan, said storage reallocation plan being associated with a primary storage volume, a secondary storage volume, and one or more client computing devices;
  - determine a systematic importance indicator, said systematic importance indicator being associated with said primary storage volume;
  - determine a systematic connectivity indicator, said systematic connectivity indicator being associated with said storage reallocation plan and said one or more client computing devices; and
  - determine a storage reallocation conclusion based on said systematic importance indicator and said systematic connectivity indicator, wherein said instructions to determine said storage reallocation conclusion further comprise instructions to:
    - responsive to said systematic connectivity indicator indicating a complete connectivity condition, approve said storage reallocation plan; and
    - responsive to said systematic connectivity indicator indicating a non-complete connectivity condition:
      - responsive to said systematic importance indicator indicating a non-vital primary storage condition, reject said storage reallocation plan; and
      - responsive to said systematic importance indicator indicating a vital primary storage condition, approve a modified storage reallocation plan.

12. The computer system of claim 11, wherein:
- said computer program instructions further comprise instructions to identify a client system complex, said client system complex comprising said one or more client computing devices; and
- said modified storage reallocation plan comprises removing at least one of said one or more client computing devices from said client system complex.

13. The computer system of claim 11, wherein said instructions to determine said systematic connectivity indicator further comprise instructions to:
- determine whether each of said one or more client computing devices can access said secondary storage volume;
- responsive to determining that each of said one or more client computing devices can access said secondary storage volume, determine a complete connectivity condition; and
- responsive to determining that at least one of said one or more client computing devices cannot access said secondary storage volume.

14. The computer system of claim 11, wherein said systematic importance indicator is selected from the group consisting of:
- a vital primary storage condition; and
- a non-vital primary storage condition.

* * * * *